(12) United States Patent
Voorhees

(10) Patent No.: US 8,046,560 B1
(45) Date of Patent: Oct. 25, 2011

(54) SERIAL NUMBER BASED STORAGE DEVICE ALLOCATION

(75) Inventor: Bruce Voorhees, Loveland, OH (US)

(73) Assignee: EMC Corporation, Hopkinton, MA (US)

( * ) Notice: Subject to any disclaimer, the term of this patent is extended or adjusted under 35 U.S.C. 154(b) by 1889 days.

(21) Appl. No.: 10/971,892

(22) Filed: Oct. 22, 2004

(51) Int. Cl.
*G06F 12/00* (2006.01)

(52) U.S. Cl. .................. 711/202; 711/165; 711/200

(58) Field of Classification Search .................. 711/165, 711/202, 200
See application file for complete search history.

(56) References Cited

U.S. PATENT DOCUMENTS

| | | | |
|---|---|---|---|
| 6,243,762 B1 * | 6/2001 | Greene et al. ............... | 719/310 |
| 6,480,903 B1 * | 11/2002 | Voutaz et al. ............... | 719/328 |
| 7,103,665 B2 * | 9/2006 | Shinohara et al. .......... | 709/226 |
| 2002/0095487 A1 * | 7/2002 | Day et al. ................... | 709/223 |
| 2003/0061491 A1 * | 3/2003 | Jaskiewicz et al. ......... | 713/182 |

* cited by examiner

Primary Examiner — Tuan Thai
Assistant Examiner — Zhuo Li
(74) Attorney, Agent, or Firm — Van Pelt, Yi & James LLP

(57) ABSTRACT

Serial number based storage device allocation is disclosed. A serial number associated with the storage device is mapped to a device file associated with the storage device on a host having a connection to the storage device. The serial number is mapped to a device address by which the storage device is known to a library with which the storage device is associated. A request requiring that an available storage device be allocated to service the request is received. The storage device is allocated, based at least in part on the serial number to device file and serial number to device address mappings, to service the request.

23 Claims, 9 Drawing Sheets

| Host ID | Device File | Serial No. |
|---|---|---|
| X | /dev/rmt/0cbn | 130 |
| X | /dev/rmt/1cbn | 132 |
| X | /dev/rmt/2cbn | 134 |
| Y | \\.\Tape0 | 132 |
| Y | \\.\Tape1 | 130 |
| Y | \\.\Tape2 | 134 |

SERIAL NUMBER BASED STORAGE DEVICE ALLOCATION

CROSS REFERENCE TO OTHER APPLICATIONS

Co-pending U.S. patent application Ser. No. 10/737,715 entitled AUTOMATED MEDIA MANAGEMENT filed Dec. 16, 2003, is incorporated herein by reference for all purposes.

FIELD OF THE INVENTION

The present invention relates generally to removable media storage devices. More specifically, serial number based storage device allocation is disclosed.

BACKGROUND OF THE INVENTION

Typically, removable media libraries, e.g., tape libraries, contain multiple removable media storage devices, e.g., tape drives. The devices typically are referenced in the library by an address. In some configurations, the storage devices may be connected to multiple hosts, e.g., via a storage area network (SAN). Each storage device to which a host has a connection is referenced on the host by a device file.

Accessing and using a storage device, such as a tape drive, requires four data values: library, device address within library, host, and device file on the host. With this data, a data mover (e.g., a backup application or system) or a media and library management application or system, can perform such operations as allocating a storage device for use in performing a desired backup or other operation, mounting a specified volume of media on the device, and causing a host having a connection to the device to read data from and/or write data to a media volume mounted on the device. To perform such operations, it is necessary for a data mover and/or media and library management application or system to receive or create a mapping of which device files on the host side correspond to which storage devices as they are known on the library side.

Currently, this mapping is either input manually or discovered by a laborious process of mounting a volume of media on each storage device in succession and checking each host to determine which device file on the host, if any, shows an "on line" status indicating it is the device file on the host that is associated with the storage device on which the volume of media was mounted. Depending on the environment (e.g., number of hosts, libraries, and devices and how they are connected), this process can be time consuming. In addition, changes to the storage network and/or connections, such as adding or removing a new device, library, and/or host, may result in the mapping no longer being accurate, potentially resulting in errors and the need to repeat the inefficient process of creating the mapping. For example, in the case of hosts running a Microsoft™ operating system such as Microsoft™ Windows NT™, the operating system upon reboot of the host system may assign a new (different) device file name to a storage device, e.g., if a new storage device were connected in a position in front of an existing device.

Therefore, there is a need for a better way to create, verify, and update the mapping between the addresses by which storage devices are known to their respective libraries and the corresponding device file by which each device is known to the respective hosts having a connection to the device.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Serial number based storage device allocation is disclosed. In one embodiment, a device path associated with a storage device is obtained from a host associated with the storage device. A serial number associated with the storage device is obtained from the host. An association is established between the device path and the serial number. In one embodiment, the association is used to allocate the storage device to a data mover for use in performing a data storage operation using the storage device.

Figure 1:
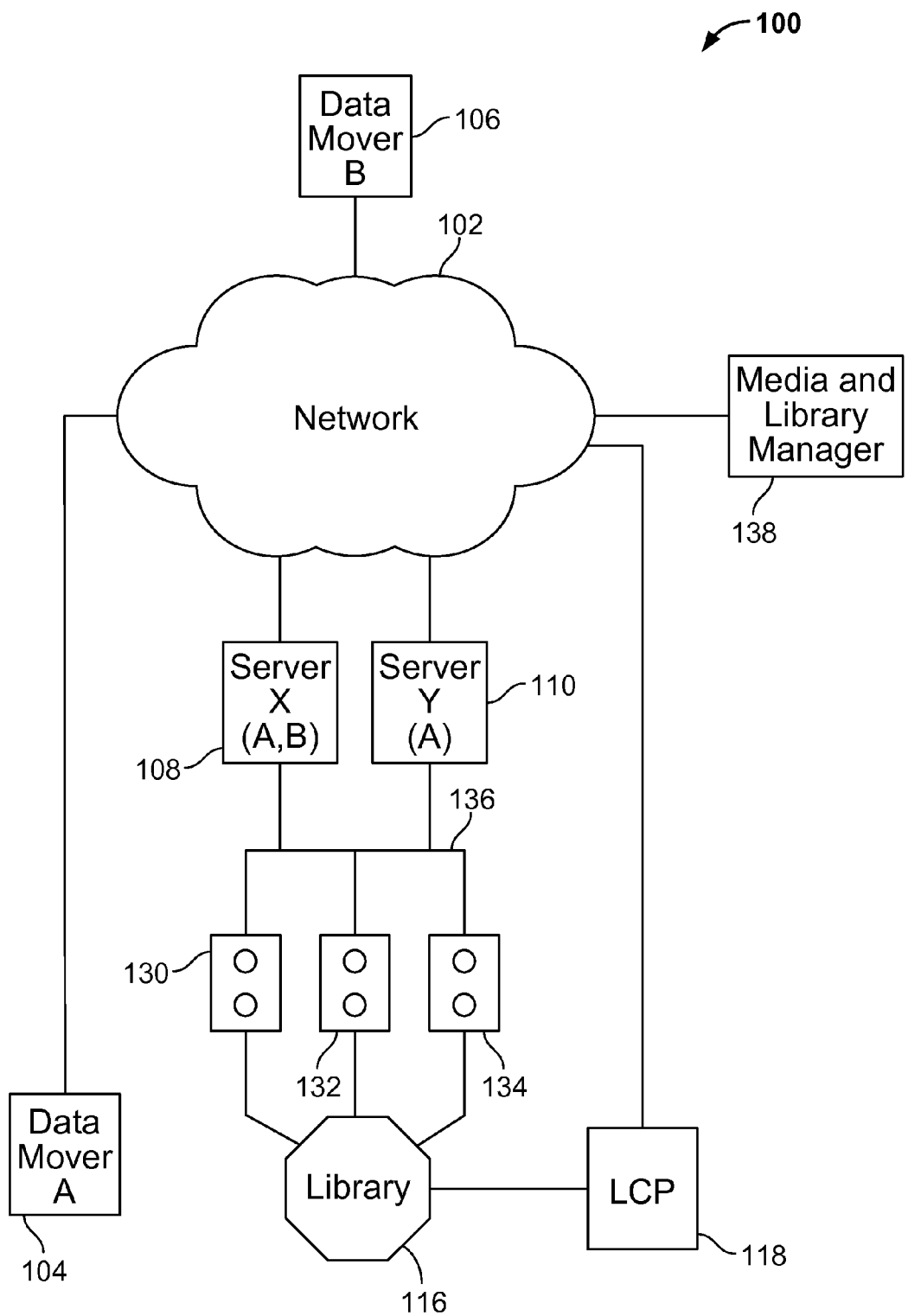
FIG. 1 is a block diagram illustrating one exemplary embodiment of a network environment and a media management system.

FIG. 1 is a block diagram illustrating one exemplary embodiment of a network environment and a media management system. The system 100 comprises a network 102, which may be a local area network (LAN) or any type of private or public network. The system 100 further comprises servers A, B, X, and Y, identified by reference numerals 104, 106, 108, and 110, respectively, in FIG. 1, connected to network 102. In the example shown in FIG. 1, a first backup application, such as the NetWorker™ backup application available commercially from the Legato Software Division of EMC Corporation, is installed on server A (104), and a second backup application is installed on server B (106). The first and second backup applications may be the same or different products. In one embodiment, the backup application is a distributed application, and a portion of the backup application (i.e., a data mover agent) is installed on server A (104). The data on server X (108) is backed up by both the first backup application installed on server A (104) and the second backup application installed on server B (106), as is indicated in FIG. 1 by the letters "A" and "B" in parentheses below the letter "X". Such a configuration may be used, e.g., to provide two independent backups for particularly critical data, or where separate data mover programs are each responsible for backing up a separate set of data on the same server. Server Y (110) is backed up by the first backup application installed on server A (104). Server A may likewise comprise a body of data that is backed up by operation of the first backup application installed on server A, and server B may comprise a body of data that is backed up by operation of the second backup application installed on server B. The storage media used by the first and second backup applications installed on servers A and B, respectively, reside in storage media library 116. Storage media library 116 may be of any type. For example, storage media library 116 may be a SCSI library configured to be controlled directly by a library host 118 via a small computer systems interface (SCSI) connection. Storage media library 116 may instead be an ACSLS library, which is an automated cartridge system library software-controlled library of the type available commercially from StorageTechnology Corporation (StorageTek™) of Louisville, Colo. An ACSLS-type library is controlled using a software controller provided for that purpose, as opposed to being controlled directly by the library host. Library host 118 is connected to and configured to control library 116. Library host 118 also is connected to network 102. While examples of a SCSI and ACSLS type library are described, any number or combination of types of libraries may be used, including without limitation IBM 3494, ADIC AML, and/or any other type of library. Library 116 has associated with and connected to it tape drives 130, 132, and 134. Tape drives 130, 132, and 134 are connected to servers X (108) and Y (110) via a storage area network (SAN) 136. SAN 136 makes it possible for each of servers X and Y to read from or write to any one of the SAN-connected tape drives 130, 132, and 134.

A media and library manager (MLM) 138 coordinates operations between the first backup application running on server A and the second backup application running on server B, such as by receiving and arbitrating between potentially competing requests for resources associated with library 116, as well as executing such requests. For example, the MLM may receive requests from the backup applications that a particular tape residing in the library be inserted into a tape drive. The MLM may provide other functionality, such as keeping track of tapes stored in the library and elsewhere. MLM 138 has a connection to the network 102, which it uses to communicate with other nodes connected to network 102 as described more fully below. MLM 138 may comprise a server connected to network 102.

As described in U.S. patent application Ser. No. 10/737,715, which is incorporated by reference above, in some embodiments, a library control program (LCP) is installed on library host 118. An LCP is a software agent configured to control a library to be managed by an MLM. The LCP could reside on any host that has a controller connection (e.g., SCSI) to the library. Similarly, a drive control program (DCP) is installed on servers 108 and 110 in some embodiments. A DCP is a software agent configured to control a storage device (e.g., a tape drive) to be managed by an MLM. The DCP could reside on any host that has a controller connection (e.g., SCSI) to one or more storage devices. The system could include more than one LCP and more than one DCP, as needed.

Each of servers A, B, X, and Y may comprise different hardware and/or may be running a different operating system (or version thereof). In addition, the type of media stored in library 116 may vary. Also, certain elements may be connected to an associated tape device differently than others. For example, servers X and Y are connected to tape drives 130, 132, and 134 via a SAN, while servers A and B may have direct SCSI connections to other tape drives to which they are connected (not shown).

Figure 2:
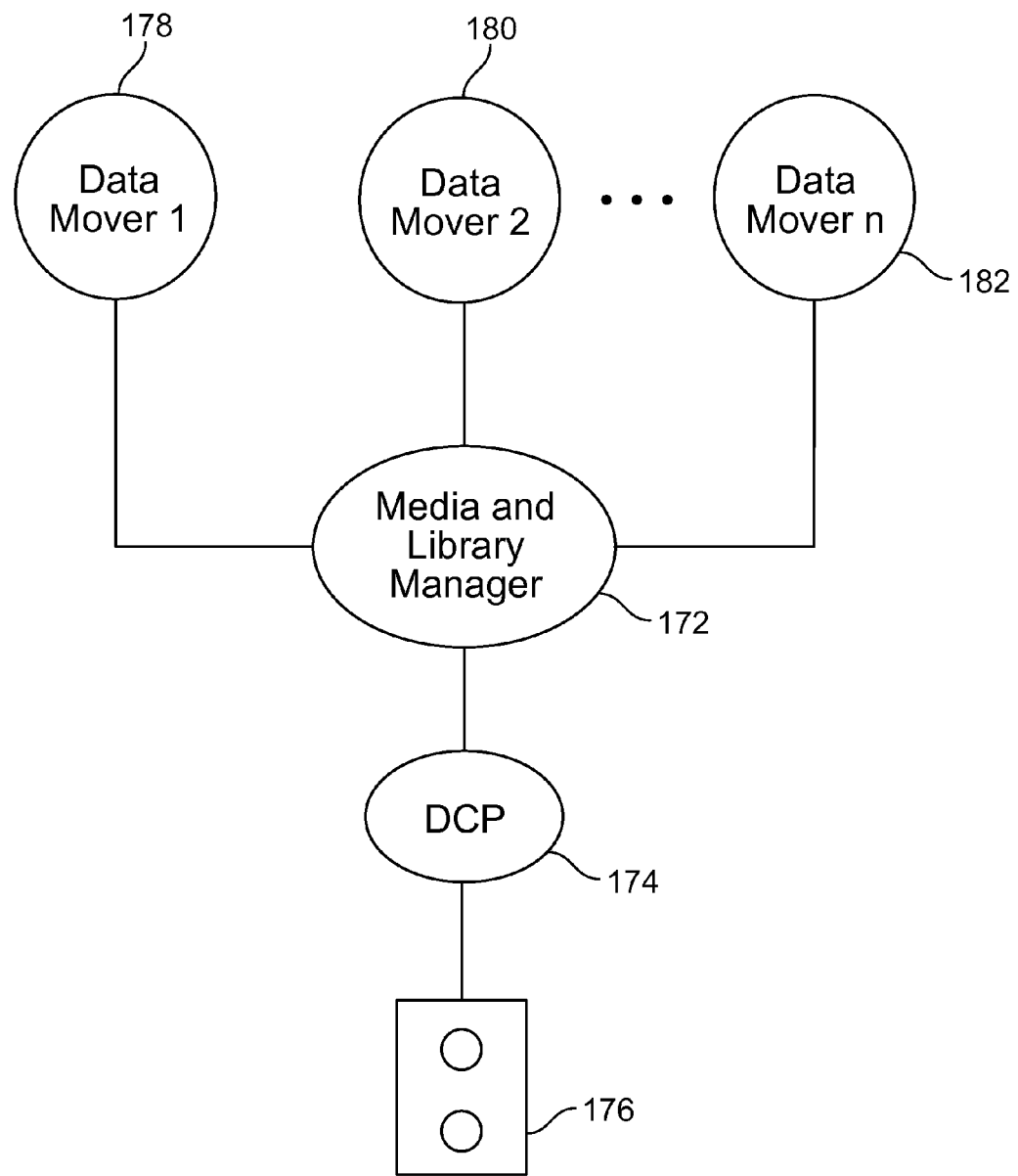
FIG. 2 is a schematic diagram showing the relationship between the media and library manager, the data movers, and a storage device and associated resources in one embodiment.

FIG. 2 is a schematic diagram showing the relationship between the media and library manager, the data movers, and a storage device and associated resources in one embodiment. In the example shown, the media and library manager 172 is configured to control the storage device 176 via the DCP 174. For example, DCP 174 may be configured to communicate with a tape drive via a SCSI connection or a SAN. A plurality of data movers 1 to n, represented in FIG. 2 by data movers 178, 180, and 182, each has an interface to the media and library manager, which each uses to send requests for resources and/or operations by the storage device 176 to the media and library manager 172. The media and library manager 172 services the requests, arbitrating between conflicting requests for the same resource. Using an architecture such as the one shown in FIG. 2 simplifies the development and quality assurance process associated with developing a data mover application, e.g., by enabling the developer to create a single interface to the media and library manager, instead of having to develop a separate hardware interface for each type of storage device or other resource the data mover application may be required to be configured or configurable to control if the data mover were to be expected to control such storage devices or other resources directly, as opposed to relying on the media and library manager to perform such functions. In the approach shown, a hardware interface would have to be developed and validated through a quality assurance process for each type of storage device, for example, only for the media and library manager 172, and not separately for each data mover application. The approach illustrated in FIG. 2 also facilitates the role of the media and library manager in arbitrating between conflicting or competing requests from different data movers, as described herein. For example, under the approach shown in FIG. 2 only the media and library manager 172 controls the storage device 176. If each data mover were able to control the storage device directly, each would think it "owned" the storage device during times when it was using the storage device, which could result in other data movers being locked out of use of the storage device, even if the other data movers had more urgent requests for resources associated with the storage device. Under the approach shown, the media and library manager can decide which requests from which data mover(s) will be serviced using which resources and at which time, ensuring that the most important requests are serviced first, as described more fully below.

Figure 3:
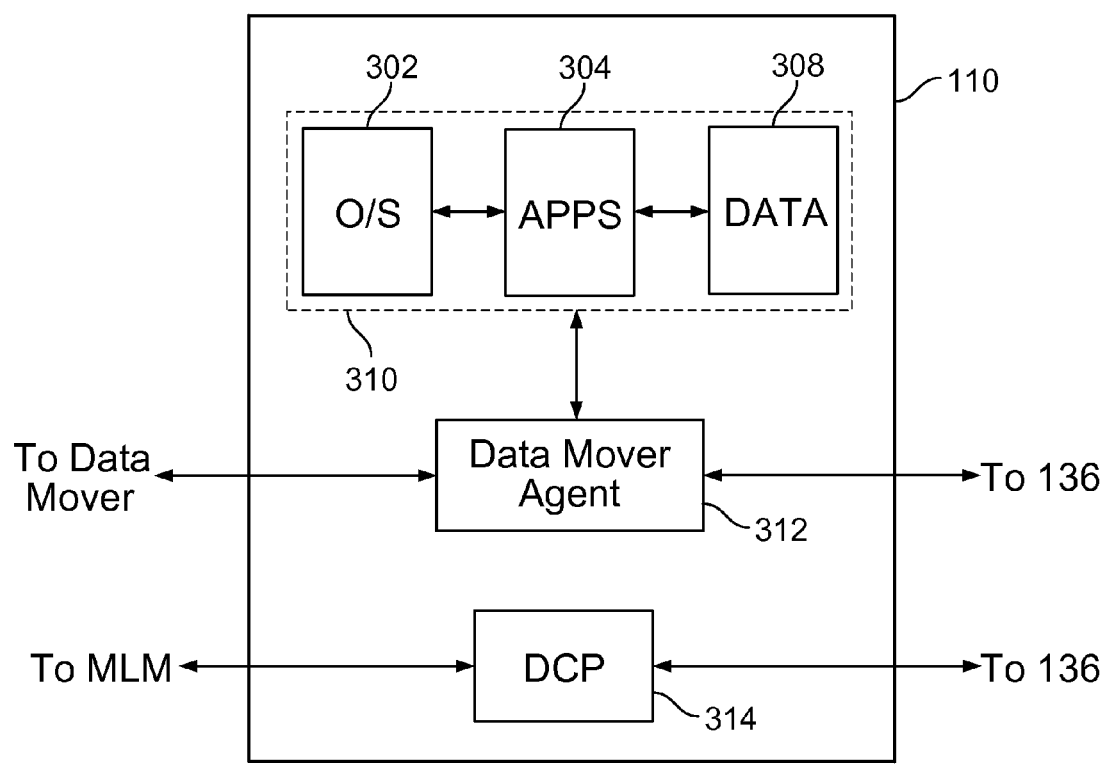
FIG. 3 is a block diagram illustrating one embodiment of a server, such as server Y (110) from FIG. 1.

FIG. 3 is a block diagram illustrating one embodiment of a server, such as server Y (110) from FIG. 1. In this example, server 110 is shown to include an operating system 302, applications 304, and data 308, which serve the primary functionality 310 of server 110. Data mover agent 312 resides on server 110 to allow data mover A (i.e., the data mover on server A) to control a storage device (e.g., tape drive 130) associated with server 110. In some embodiments, the entire data mover resides on server 110 and data mover agent 312 is the entire data mover application. In some embodiments, server 110 includes more than one data mover agent, depending on how many data movers are configured to manipulate data on server 110. For example, in the case of server X (108) of FIG. 1, each of data movers A and B would have an agent installed on server X, because each is configured to move data to/from server X.

DCP 314 resides on server 110 to allow a properly configured application or device, such as MLM 138, to control a storage device (such as tape drive 130) associated with server 110. For example, DCP 314 may receive and generate in response to a command from MLM 138 or data mover agent 312 a control message to control tape drive 130 as required, e.g., to cause the drive to eject a tape. In the example shown in FIG. 1, the DCP 314 may be configured to communicate with drive 130, e.g., via SAN 136.

In some embodiments, data mover agent 312 and DCP 314 are connected to network 102 using a network interface card or other appropriate device. Thus data mover agent 312 and DCP 314 can communicate over the network with an associated data mover and the MLM, respectively.

Figure 4:
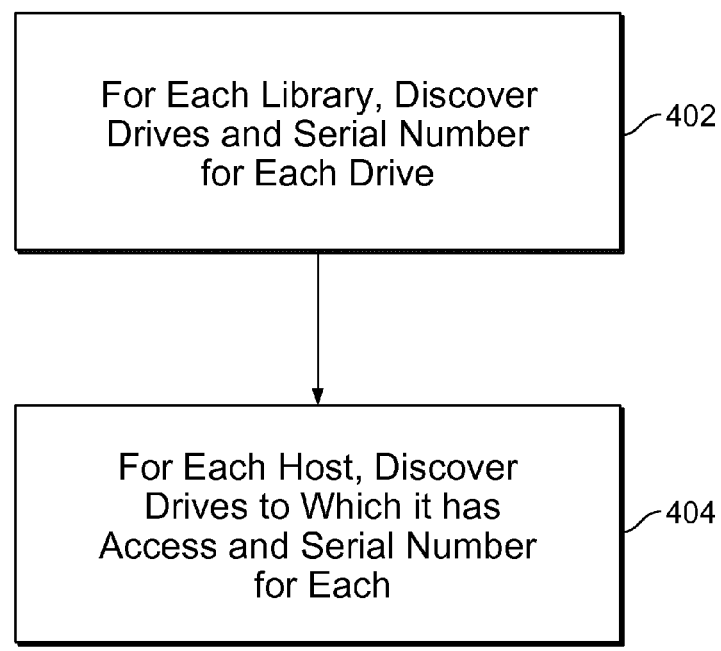
FIG. 4 is a flowchart illustrating a process used in one embodiment to create a mapping between storage device serial numbers and the corresponding names by which each storage device is known to the library and host(s) with which it is associated.

FIG. 4 is a flowchart illustrating a process used in one embodiment to create a mapping between storage device serial numbers and the corresponding names by which each storage device is known to the library and host(s) with which it is associated. For each library, the tape drives (or other storage devices) and the drive serial number associated with each drive is discovered (402). Each drive in a library has a library-facing side, at which tapes can be inserted (mounted) and removed (unmounted) and a host-facing side, to which connection may be made by a host, such as a direct SCSI or a SAN connection, to enable the host to read data from and/or write data to a volume of storage media mounted on the drive. Typically, each drive is assigned by its manufacturer a unique serial number that can be read or otherwise determined by the library at the library-facing side and which can also be read or determined by the host at the host-facing side. In some embodiments, 402 includes discovering with respect to each library the address by which each drive is known to the library and the corresponding serial number for each drive, and creating an association or mapping between the device addresses and their corresponding serial numbers. For each host, the drives to which it has access (e.g., through a SCSI, SAN, or other connection) are discovered and the respective serial number for each is determined.

Figure 5:
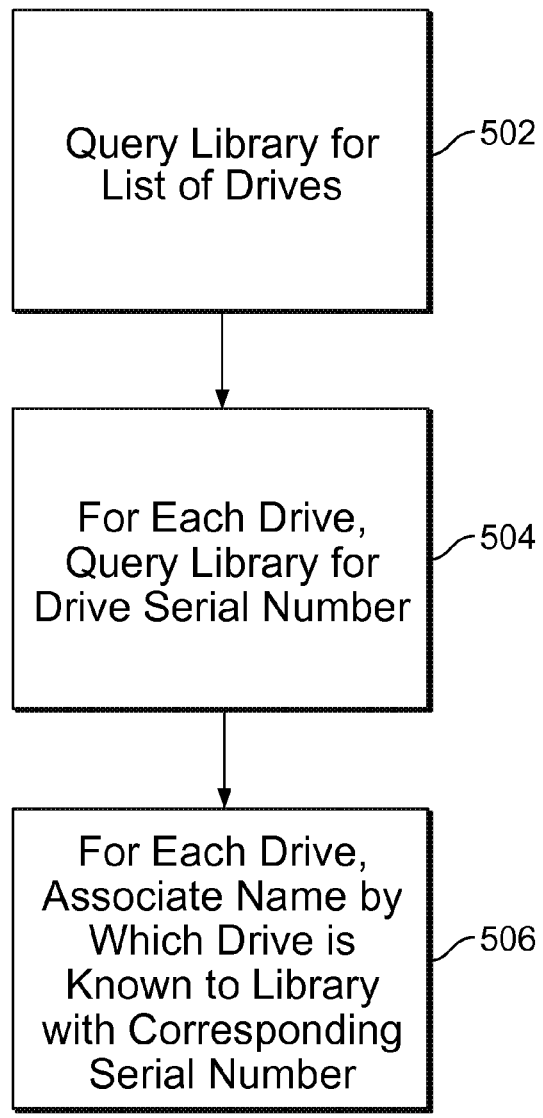
FIG. 5 is a flow chart illustrating a process used in one embodiment to discover drives associated with a library and learn the serial number for each drive.

FIG. 5 is a flow chart illustrating a process used in one embodiment to discover drives associated with a library and learn the serial number for each drive. In one embodiment, the process of FIG. 5 is used to implement 402 of FIG. 4. The library is queried for a list of drives (502). In one embodiment, a media and library manager application such as MLM 138 of FIG. 1 queries the library, e.g., library 116 of FIG. 1, via an LCP such as LCP 118 and/or some other agent on a host have a connection to the library. For each drive in the library, the library is queried to obtain the serial number for the drive (504). For each drive, the serial number is associated with the address (or other name or path) by which the drive is known to the library (506).

Figure 6:
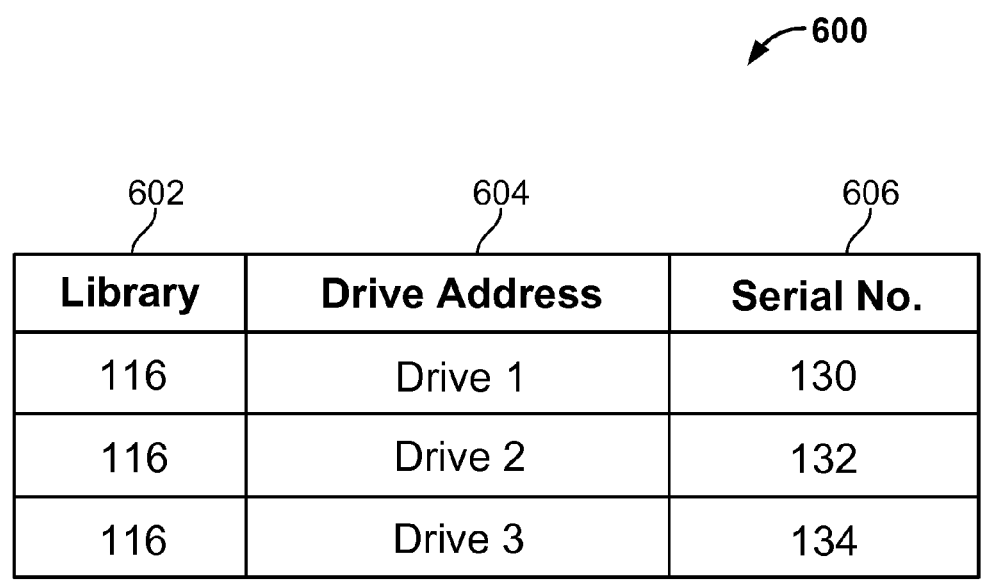
FIG. 6 illustrates a data structure used in one embodiment to map drive serial numbers to the corresponding drive addresses by which the library knows the drives.

FIG. 6 illustrates a data structure used in one embodiment to map drive serial numbers to the corresponding drive addresses by which the library knows the drives. The "library drive serial number mapping table" 600 includes a library column 602 in which the library in which the drive is located is identified. In the example shown, the reference numeral "116" is listed for each drive associated with the library 116 of FIG. 1. A drive address column 604 comprises for each drive an entry representing the address or other name by which the drive is known to the library. In the example shown, the drives 130, 132, and 134 of FIG. 1 are indicated as having the fictitious names "Drive 1", "Drive 2", and "Drive 3", respectively. In serial number column 606, the serial number for each drive is listed. In the example shown, the reference numerals from FIG. 1 are listed as the fictitious serial numbers for drives 130, 132, and 134 of FIG. 1.

Figure 7:
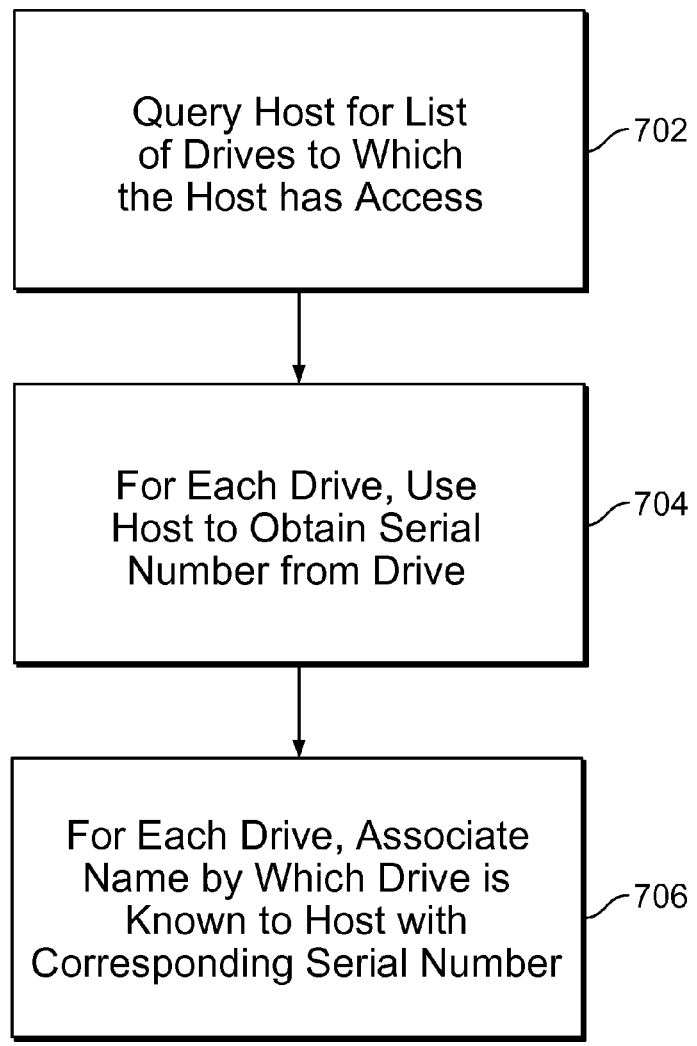
FIG. 7 is a flowchart illustrating a process used in one embodiment to create a mapping between the device files by which drives are known on a host and the corresponding drive serial number for each drive.

FIG. 7 is a flowchart illustrating a process used in one embodiment to create a mapping between the device files by which drives are known on a host and the corresponding drive serial number for each drive. In one embodiment, the process of FIG. 7 is used to implement 404 of FIG. 4. The host is queried for a list of drives to which the host has access (702). In one embodiment, a media and library management application, such as MLM 138 of FIG. 1, queries a DCP or other agent installed on the host. For each drive to which the host has access, the host is used to query the drive to obtain the serial number for the drive (704). For each drive to which the host has a connection, the name (e.g., device file) by which the drive is known on the host is associated with the corresponding drive serial number (706).

Figure 8:
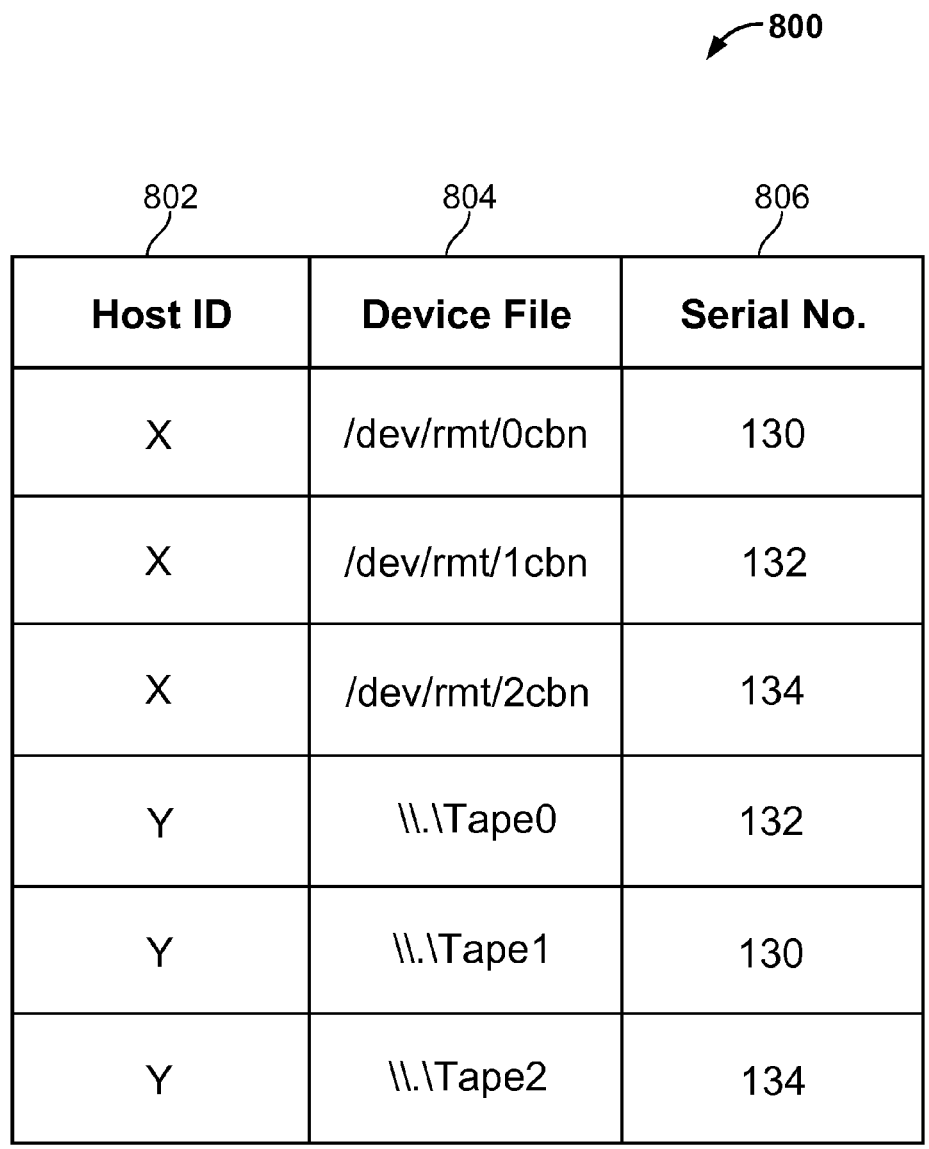
FIG. 8 illustrates a data structure used in one embodiment to map drive serial numbers to the corresponding device files by which the host(s) having a connection to the drive know the drive.

FIG. 8 illustrates a data structure used in one embodiment to map drive serial numbers to the corresponding device files by which the host(s) having a connection to the drive know the drive. The "host device file—drive serial number mapping table" 800 includes a host identifier column 802 in which an identifier associated with the host to which each row of the table 800 pertains is stored. In the example shown, the hosts are listed as server "X" and server "Y", corresponding to server X (108) and server Y (110) of FIG. 1. The table 800 includes a device file column 804 in which the device file associated with the drive to which the entry (row) pertains on the host associated with the entry is stored. In the example shown, server X is a UNIX server and server Y is running a Microsoft™ Windows operating system, as can be seen from the format of the device file paths shown in FIG. 8. As noted above, in the case of Windows™ and possibly other operating systems the device file names are regenerated each time the system is rebooted, and the filename associated with a particular drive may change if the configuration of the storage node/network has changed, such as by adding, removing, or replacing one or more drives or other devices. As shown, each host may assign device file names in different order, depending on the operating systems, configuration, connections, etc., with the result that drive "1" to one host may be drive "0" to another having a connection to the same drive (e.g., drive 130 in the example shown). By using drive (or other storage device) serial numbers to identify and allocate drives for data storage related operations, each drive is identified by a unique and constant identifier, the serial number. As described more fully below in connection with FIG. 9, topography and/or other changes that render invalid a previously-learned mapping between a library device address and/or host device file and a drive serial number can be detected more readily, before an allocation potentially resulting in a failed operation or other error condition, and a remapping generated quickly on the fly, if necessary, to enable the desired operation to proceed.

Figure 9:
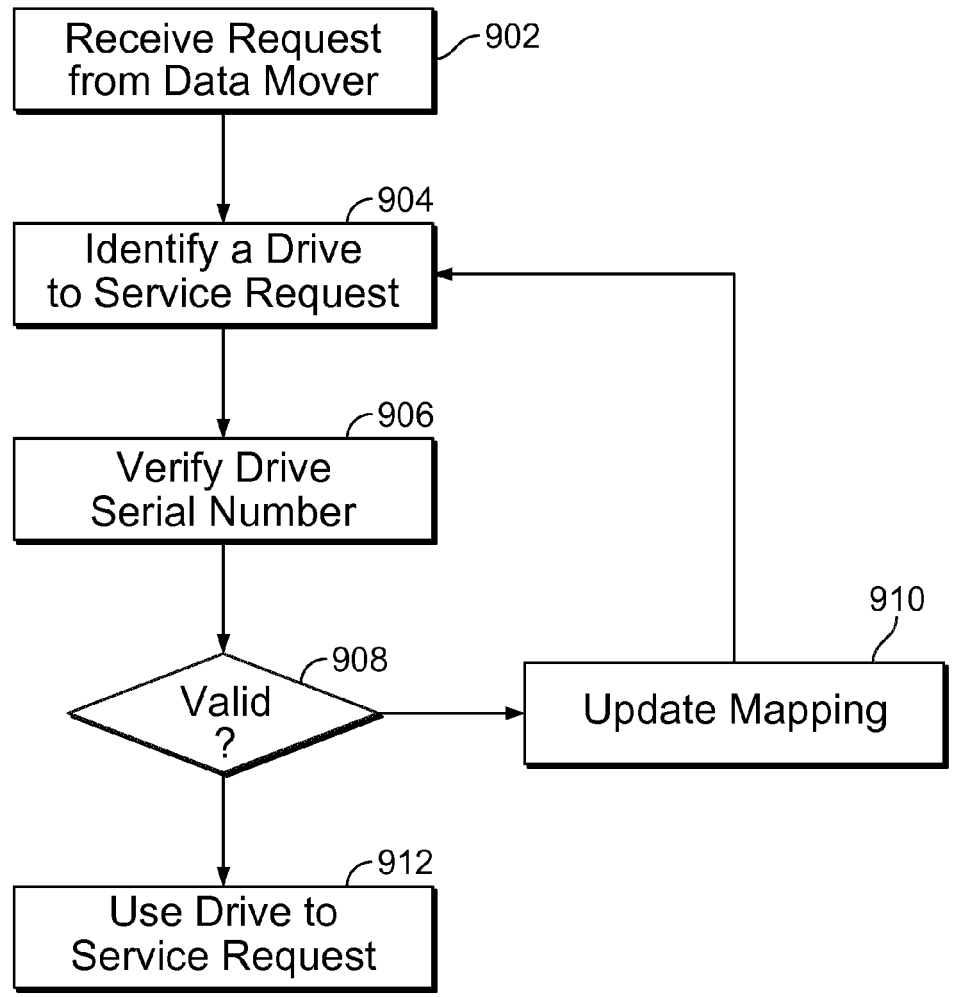
FIG. 9 is a flow chart illustrating a process used in one embodiment to allocate tape drives based at least in part on drive serial numbers.

FIG. 9 is a flow chart illustrating a process used in one embodiment to allocate tape drives based at least in part on drive serial numbers. In one embodiment, the process of FIG. 9 is implemented by a media and library management application or system, such as MLM 138 of FIG. 1. A request requiring that a drive be allocated to perform a desired data storage related operation is received from a data mover (902). In one embodiment, the data mover may be a backup application or server, such as data movers A (104) and B (106) of FIG. 1. An available drive capable of being used to service the request is identified (904). In one embodiment, to be identified in 904 a drive must be available (i.e., not currently in use or reserved for use to perform another operation, e.g., one that has already started and/or has higher priority); associated with a library in which a/the volume of storage media (e.g., tape) required to perform the data storage related operation (e.g., a tape specified in the request, or a tape of a type and status suitable for use in performing the operation); and have a connection (e.g., SCSI, SAN) to the host with which the request is associated. The serial number of the drive identified in 904 is verified (906). In one embodiment, 906 comprises verifying that the mapping between the serial number and the corresponding device file on the host with which the request is associated remains valid. In one embodiment, a media and library manager such as MLM 138 uses a DCP or other agent on the host to query the drive for the serial number for the identified drive and then verifies the serial number is the same as the one to which the device file is mapped. If the mapping is no longer valid (908), the mapping is updated (910) and the process returns to 904, in which a suitable drive is identified. In one embodiment, 910 comprises changing in the mapping table the entry associated with the host/device file for which the new serial number was received in 906. In one embodiment, 910 comprises regenerating the mapping with respect to all drives associated with the host associated with the request. In one embodiment, the mapping can be regenerated quickly and on the fly because it is not necessary to mount and unmount media volumes, etc. to regenerate the mapping. In one alternative to the process shown in FIG. 9, the originally identified drive (i.e., the one associated with the device path) is used, if available, to service the request, even though the drive serial number has changed. In one such embodiment, the response to the data mover includes the device file on the host for the drive and the library device address by which the library knows the drive having that serial number. In one embodiment, 906 includes verifying both the host device file to drive serial number mapping and the library device address to serial number mapping. In one embodiment, the library device address to serial number mapping to drive serial number mapping is verified only if the host device file to drive serial number mapping is found to be invalid. If the host device file to drive serial number mapping is determined to be valid (908), the drive is used to service the request (912). In one embodiment, 912 includes passing to the requesting data mover a response that includes an identification of the library in which the drive resides, the drive address or other name by which the library knows the drive, an identifier associated with the host, and the device file on the host that corresponds to the drive serial number of the drive allocated to perform the operation. In other embodiments, less or more information may be passed to the data mover. In one embodiment, e.g., the data mover is only informed that the requested volume (or a suitable volume identified in the response) has been mounted on the drive associated with a device path, included in the response, by which the allocated drive is known to a host associated with the request. In one embodiment, 912 includes mounting a requested tape volume on the allocated drive, if the data storage operation requires a tape to be mounted, including by using an LCP or other agent to cause the library to mount the tape on the allocated drive. In one such embodiment, the library drive address to serial number mapping is used to determine the drive address to be used to identify to the library the drive associated with the serial number with which the allocated drive is associated.

In one embodiment, library drive serial number mapping table 600 of FIG. 6 and host device file—drive serial number mapping table 800 are included in the same database, table, and/or other data structure.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of allocating a storage device, comprising:
   mapping a serial number associated with the storage device to a device file associated with the storage device on a host having a connection to the storage device;
   mapping the serial number to a device address by which the storage device is known to a library with which the storage device is associated;
   receiving a request requiring that an available storage device be allocated to service the request; and
   allocating the storage device, based at least in part on the serial number to device file and serial number to device address mappings, to service the request.

2. A method as recited in claim 1, further comprising servicing the request based at least in part on the serial number to device file and serial number to device address mappings.

3. A method as recited in claim 2, wherein servicing the request based at least in part on the serial number to device file and serial number to device address mappings comprises causing the library to perform an operation with respect to the storage device including by using the serial number to device address mapping to identify the storage device to the library.

4. A method as recited in claim 2, wherein servicing the request based at least in part on the serial number to device file and serial number to device address mappings comprises providing a response to the request, the response including an identification of the storage device determined based at least in part on the serial number to device file mapping.

5. A method as recited in claim 1, wherein allocating the storage device comprises verifying that the serial number to device file mapping is still valid.

6. A method as recited in claim 5, further comprising updating the serial number to device file mapping if it is determined that the serial number to device file mapping is no longer valid.

7. A method as recited in claim 1, wherein mapping a serial number associated with the storage device to a device file associated with the storage device on a host having a connection to the storage device comprises querying the host to obtain from a host-facing side of the storage device said serial number associated with the storage device.

8. A method as recited in claim 7, wherein querying the host comprises sending a query to an agent installed on the host.

9. A method as recited in claim 7, wherein the host is configured to obtain the serial number from the host-facing side of the storage device.

10. A method as recited in claim 1, wherein mapping the serial number to a device address by which the storage device is known to a library with which the storage device is associated comprises querying the library to obtain from a library-facing side of the storage device said serial number associated with the storage device.

11. A method as recited in claim 10, wherein querying the library comprises sending a query to an agent installed on a library control host associated with the library.

12. A method as recited in claim 1, wherein the storage device comprises a removable storage media drive.

13. A method as recited in claim 1, wherein the storage device comprises an optical drive.

14. A method as recited in claim 1, the storage device comprises a tape drive.

15. A method as recited in claim 1, wherein the storage device comprises one of a plurality of storage devices associated with the library.

16. A method as recited in claim 1, wherein the library comprises one of a plurality of libraries, each comprising one or more storage devices.

17. A method as recited in claim 1, wherein the host comprises one of a plurality of hosts having a connection to the storage device.

18. A method as recited in claim 1, further comprising storing data associated with the serial number to device file mapping in a data structure.

19. A method as recited in claim 1, further comprising storing data associated with the serial number to device address mapping in a data structure.

20. A method as recited in claim 1, further comprising storing data associated with the serial number to device file mapping and the serial number to device address mapping in a data structure.

21. A method as recited in claim 1, further comprising storing data associated with the serial number to device file mapping in a first data structure and storing data associated with the serial number to device address mapping in a second data structure.

22. A system for allocating a storage device, comprising:
a processor configured to:
map a serial number associated with the storage device to a device file associated with the storage device on a host having a connection to the storage device;
map the serial number to a device address by which the storage device is known to a library with which the storage device is associated; and
a communication interface configured to receive a request requiring that an available storage device be allocated to service the request;
wherein the processor is further configured to allocate the storage device, based at least in part on the serial number to device file and serial number to device address mappings, to service the request.

23. A computer program product for allocating a storage device, the computer program product being embodied in a computer readable medium and comprising computer instructions for:
mapping a serial number associated with the storage device to a device file associated with the storage device on a host having a connection to the storage device;
mapping the serial number to a device address by which the storage device is known to a library with which the storage device is associated;
receiving a request requiring that an available storage device be allocated to service the request; and
allocating the storage device, based at least in part on the serial number to device file and serial number to device address mappings, to service the request.

* * * * *